Figure 1:
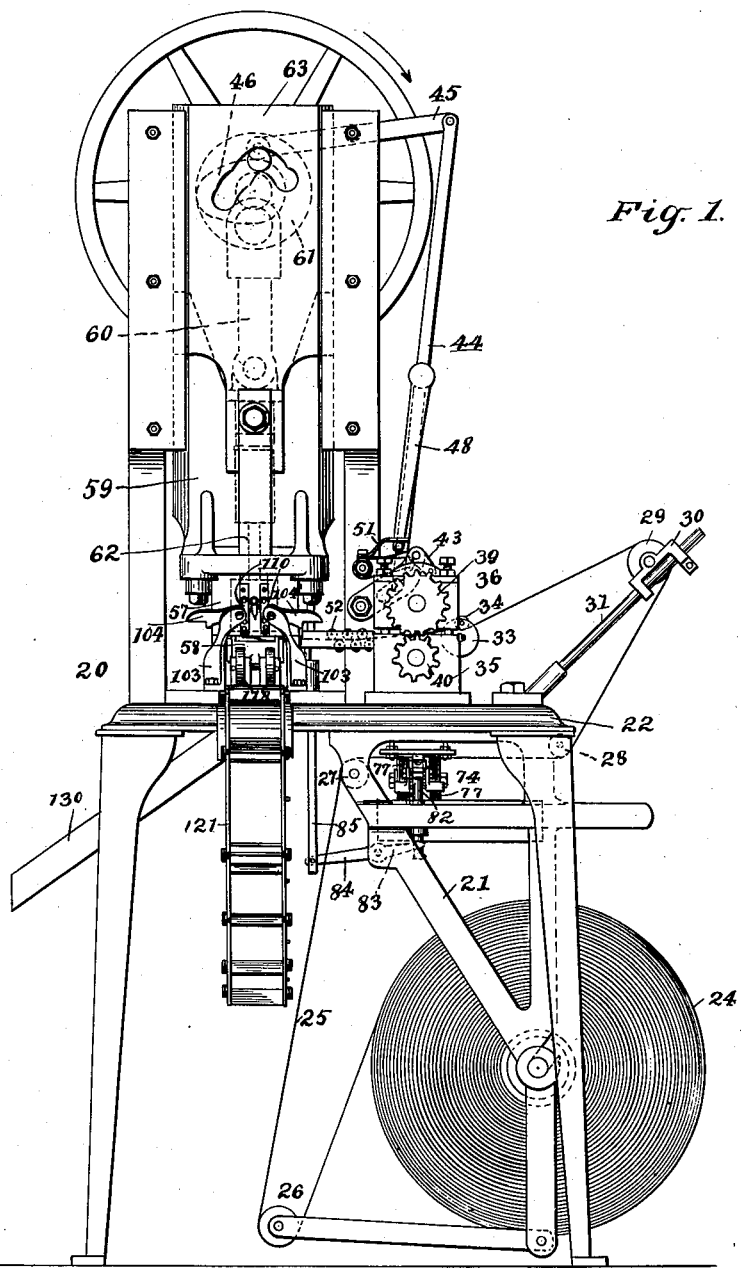

No. 628,062.  
C. R. BANNIHR.  
PAPER BOX MACHINE.  
(Application filed Sept. 3, 1897. Renewed Nov. 30, 1898.)

Patented July 4, 1899.

(No Model.)

7 Sheets—Sheet 1.

WITNESSES:

INVENTOR  
Caesar R. Bannihr.  
BY  
W. B. Hutchinson  
ATTORNEY.

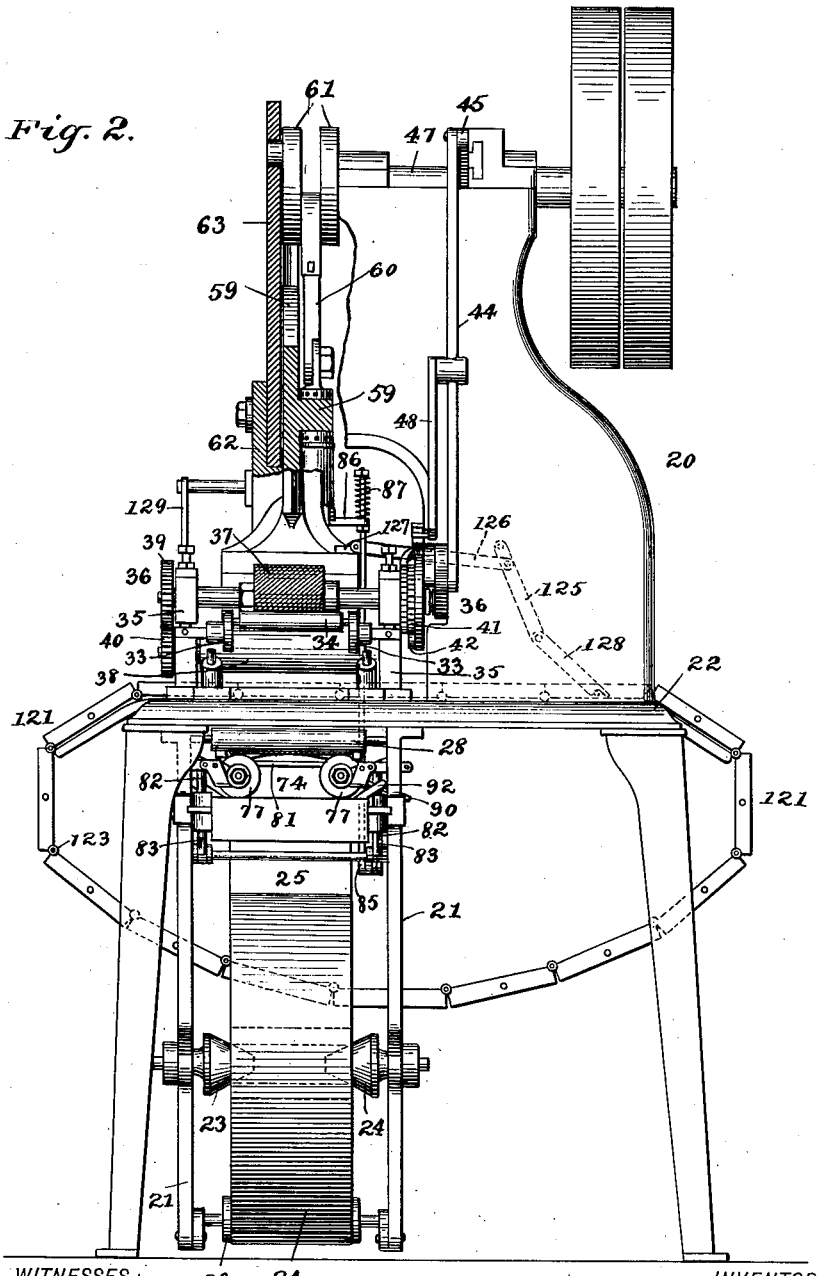

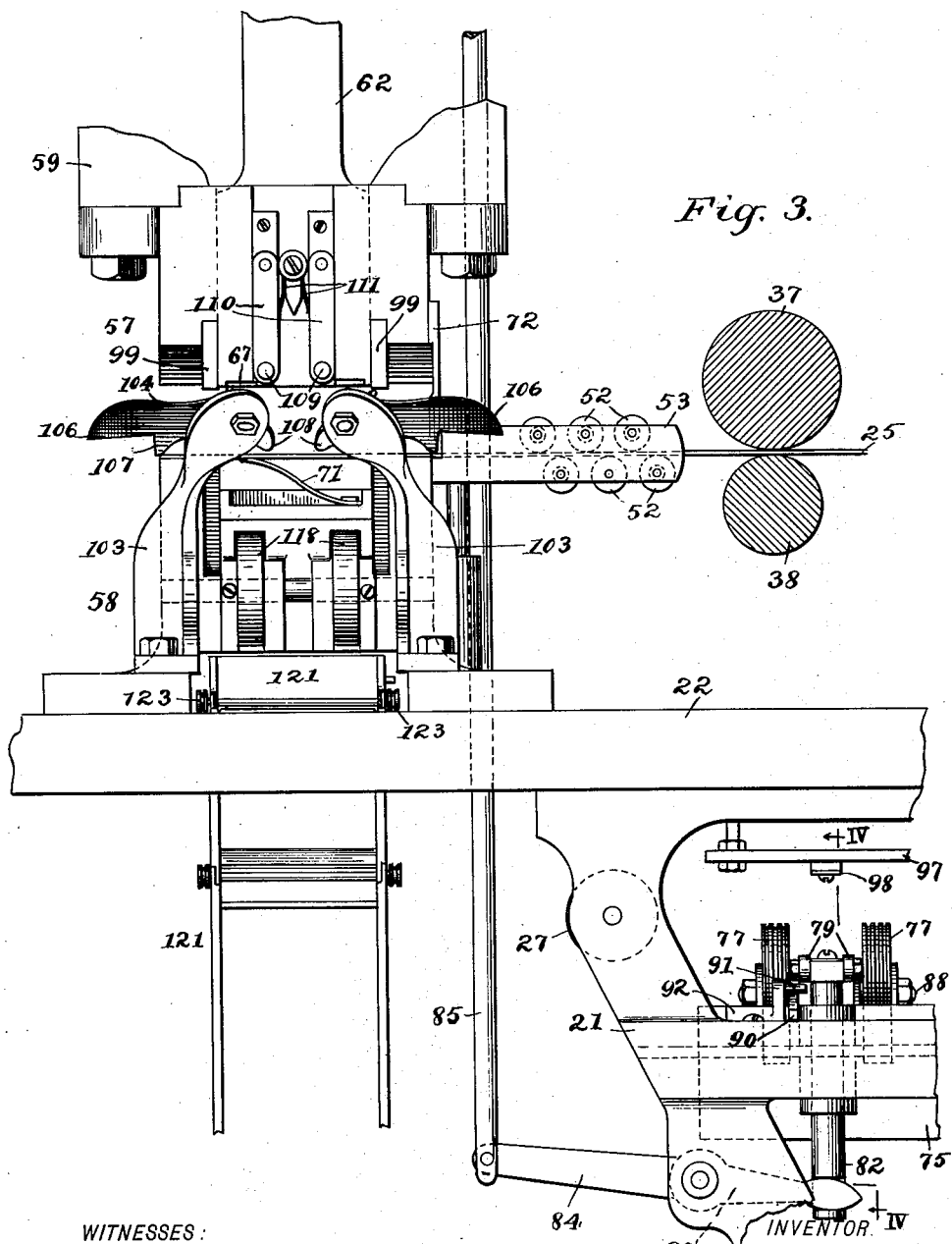

No. 628,062. Patented July 4, 1899.
C. R. BANNIHR.
PAPER BOX MACHINE.
(Application filed Sept. 3, 1897. Renewed Nov. 30, 1898.)
(No Model.) 7 Sheets—Sheet 4.
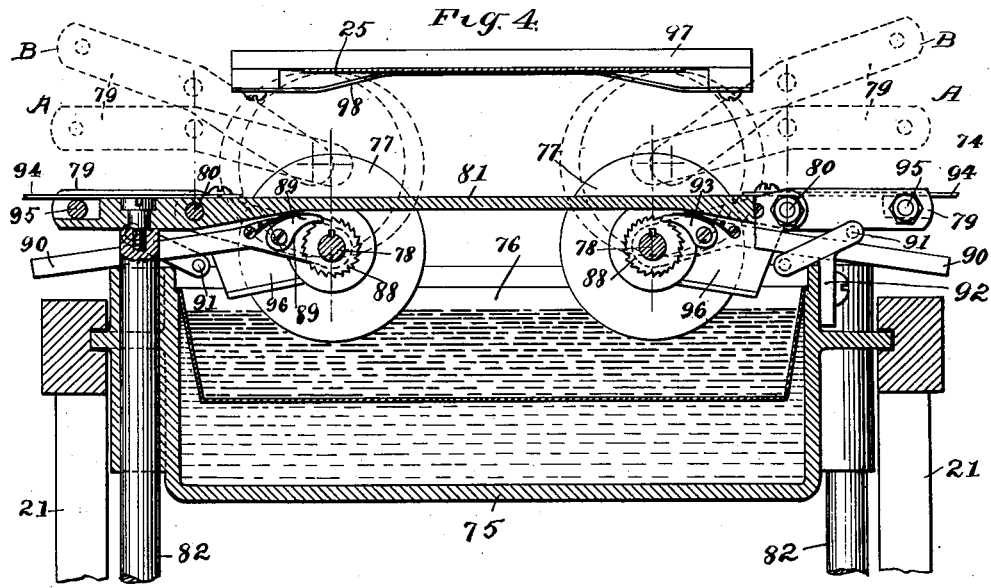
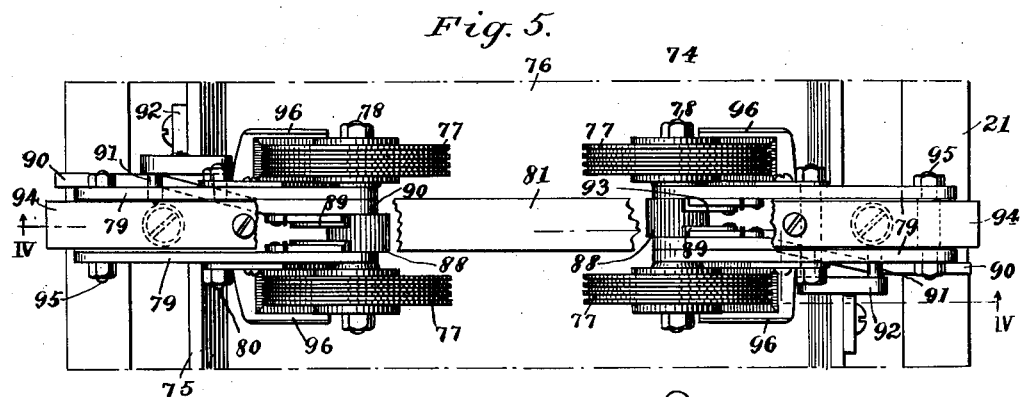
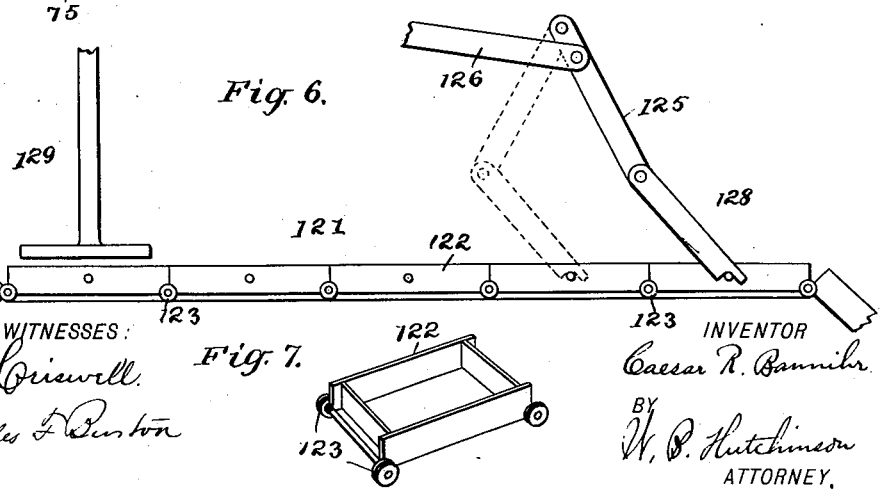
WITNESSES:
J. A. E. Criswell.
Charles F. Burton.
INVENTOR
Caesar R. Bannihr
BY
W. P. Hutchinson
ATTORNEY.

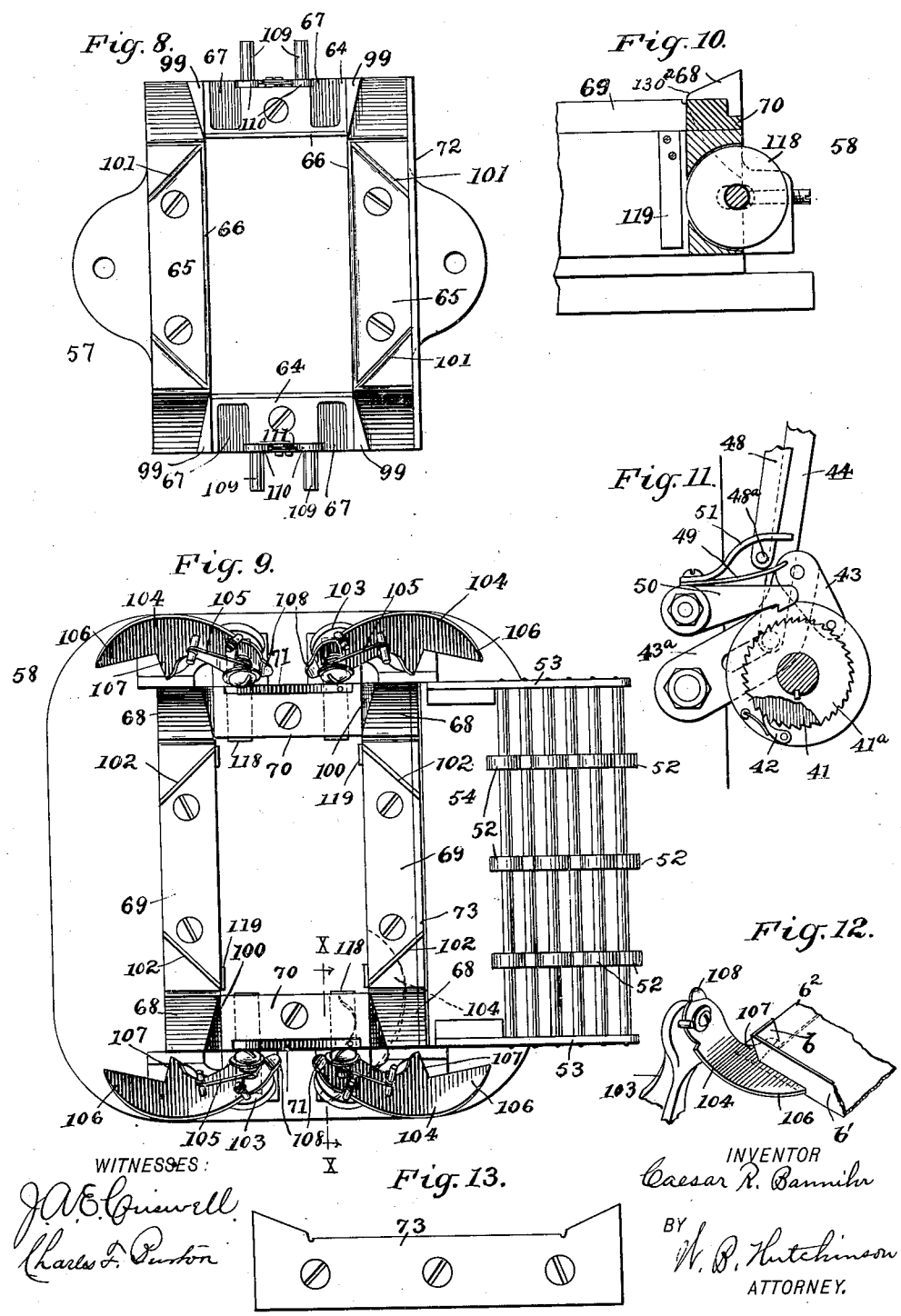

No. 628,062. Patented July 4, 1899.
C. R. BANNIHR.
PAPER BOX MACHINE.
(Application filed Sept. 3, 1897. Renewed Nov. 30, 1898.)
(No Model.) 7 Sheets—Sheet 6.
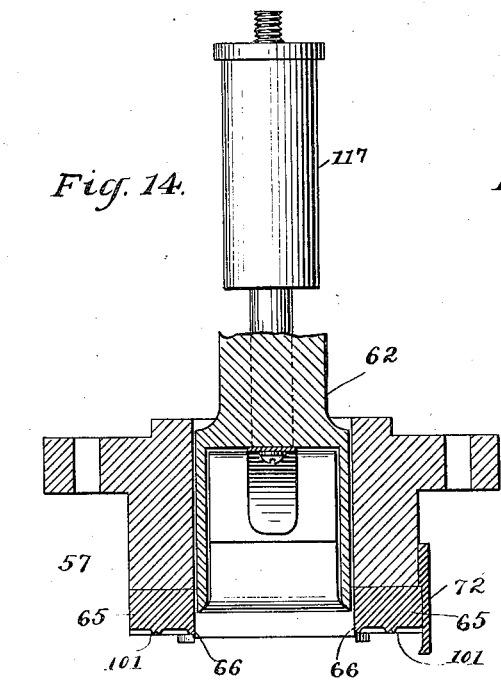
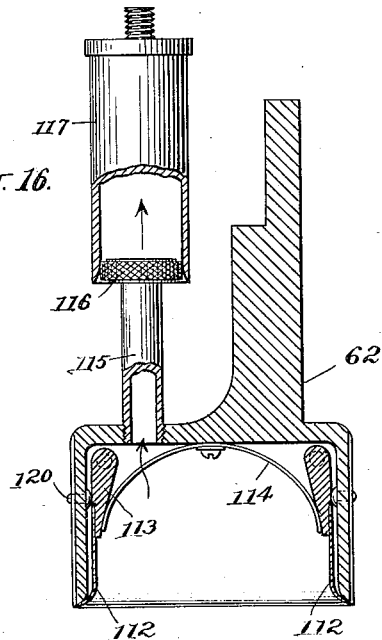
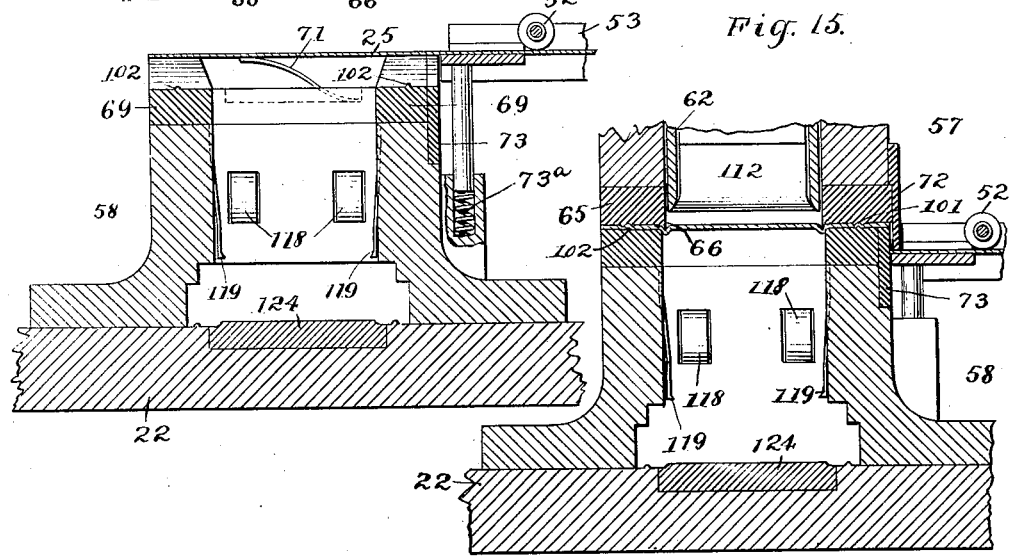
WITNESSES:
INVENTOR
Caesar R. Bannihr,
BY
W. B. Hutchinson
ATTORNEY.

No. 628,062. Patented July 4, 1899.
C. R. BANNIHR.
PAPER BOX MACHINE.
(Application filed Sept. 3, 1897. Renewed Nov. 30, 1898.)
(No Model.) 7 Sheets—Sheet 7.
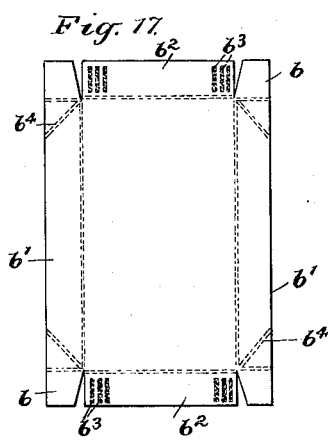
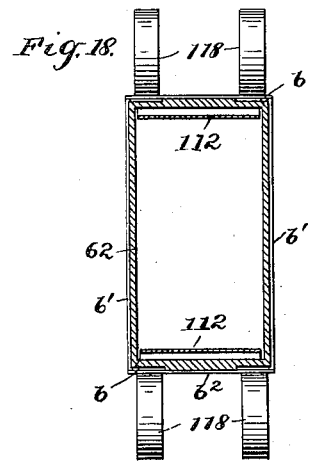
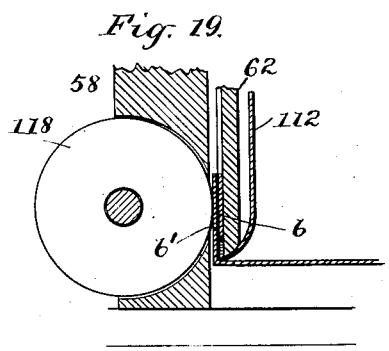
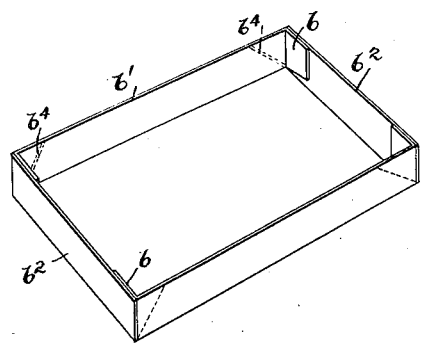
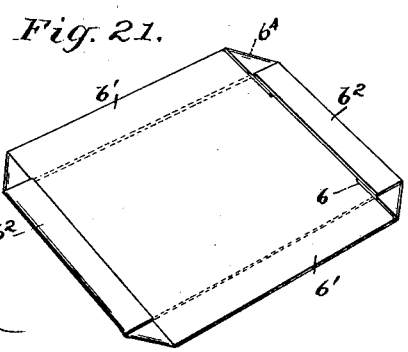
WITNESSES:
INVENTOR
Caesar R. Bannihr
BY
W. B. Hutchinson
ATTORNEY.

UNITED STATES PATENT OFFICE.

CAESAR R. BANNIHR, OF NEW YORK, N. Y.

PAPER-BOX MACHINE.

SPECIFICATION forming part of Letters Patent No. 628,062, dated July 4, 1899.

Application filed September 3, 1897. Renewed November 30, 1898. Serial No. 697,925. (No model.)

*To all whom it may concern:*

Be it known that I, CAESAR R. BANNIHR, of New York, in the county and State of New York, have invented certain new and useful Improvements in Paper-Box-Making Machines, of which the following is a full, clear, and exact description.

This invention relates to paper-box-making machines, but more particularly to machines for making folding paper boxes.

The primary object of the invention is to provide a simple and efficient machine for forming boxes from a strip or band of paper or similar material, so that said boxes may be readily bent or folded upon themselves in a collapsed position in order that the same may be readily and compactly arranged for transportation or other purposes.

Further objects of the invention are to provide simple and efficient means for cutting and forming the boxes and means whereby the gum may be readily applied at the desired points along the strip or band of paper before it is fed to the cutting and forming mechanism of the machine.

With these and other objects in view the invention consists in the construction and combination of the several parts, substantially as hereinafter described and then pointed out in the claims at the end of the description.

Referring to the accompanying drawings, forming a part of this specification, in which similar figures and letters of reference designate similar parts throughout the several views, Figure 1 is a front elevation of one form of machine embodying my invention, the upper die having been forced downward to separate a box-blank from the stock-strip. Fig. 2 is a side elevation, partly in section and partly broken away, of the machine in the position shown in Fig. 1. Fig. 3 is an enlarged front elevation of a fragmentary portion of the machine, partly in section, illustrating the cutting and folding mechanism and the means for applying gum or glue to the paper strip or band. Fig. 4 is a vertical transverse section taken on the line IV IV of Figs. 3 and 5 and showing the positions assumed by the gum-applying wheels during their upward movement. Fig. 5 is a plan view, partly broken away, of the gum-applying device, only a portion of the gum-containing pan or receptacle being shown. Fig. 6 is a diagrammatic detail view of the box-carrying belt or chain and means for operating the same. Fig. 7 is a detail perspective view of one of the links of the box-carrying chain. Fig. 8 is a detail plan view of the upper die. Fig. 9 is a detail plan view of the lower die, the folding-arms, and the vertically-movable cutting-table and guide-rolls. Fig. 10 is a fragmentary vertical sectional view of the lower die, taken on the line X X of Fig. 9. Fig. 11 is a detail view, partly in section, of a portion of the stock strip or band feeding mechanism. Fig. 12 is a fragmentary detail perspective view of a box-blank and one of the folding-arms, illustrating the position of the latter just prior to the forcing of the blank into the lower die. Fig. 13 is a detail view of the cutting-off knife of the lower die. Fig. 14 is a vertical sectional view, partly in elevation, of the upper and lower dies removed from the machine, the position of the upper die being normal or that prior to its downward movement. Fig. 15 is a vertical sectional view similar to that shown in Fig. 14 except that the upper die is partly removed and has been forced downward, so as to sever the blank from the stock strip or band. Fig. 16 is a vertical transverse section, partly in elevation, of the folding-plunger and the pump for exhausting the air above the blank while the plunger is forced downward. Fig. 17 is a detail plan view of the blank, illustrating in short lines the scoring-marks and by stippling the position of the securing gum or glue. Fig. 18 is a detail sectional plan view through the body of the folding-plunger, illustrating the position of the blank when folded around the same and the rollers of the lower die for compressing the side and end flaps forming the corners of the box together. Fig. 19 is a fragmentary vertical sectional view showing the action of the compressing-rollers during the descent of the folding-plunger. Fig. 20 is a detail perspective view of the box in position for use, and Fig. 21 is a perspective view of the box in a folded or collapsed position.

The machine-frame 20 may be of any desired form or construction and may have brackets 21 depending from the bed 22 of the frame, on which may be arranged suitable centers 23, adapted to support the drum of the stock-reel 24, though the latter may be supported directly upon the floor or other support, if so desired. The stock strip or band 25 may pass from the reel 24 over a jumping roller 26, carried by the ends of levers pivoted to the brackets 21 or to the floor or other support, in order to provide sufficient slack in the strip and to remove the strain therefrom and prevent rotation of the reel when the stock strip or band is moved forward by the feeding mechanism to be hereinafter referred to, the weight of the jumping roller 26 and the suspending-levers being sufficient to rotate the reel on its downward movement.

The stock band or strip 25 may pass over a roller 27, journaled in the brackets 21, and under the roller 28, also journaled in said brackets, and from there may pass over a roller 29, journaled in a sliding or adjustable frame 30, arranged upon the guide-rods 31, secured to the bed-plate 22 of the machine-frame, and is then passed between the guides 33, which aline the edges of the said band or strip, under the guide-roller 34, journaled in the guides 33, the latter being rigidly secured to the bearings or supports 35 of the band-feeding mechanism 36.

As herein shown, the feeding mechanism 36 has two feed-rolls 37 and 38, having their shafts journaled in the bearings or supports 35 and provided at one end thereof with gear-wheels 39 and 40, which mesh with each other in order that the feed-rolls may rotate in the proper direction. The upper feed-roll may have its periphery milled and secured to its shaft in any preferred manner, and on one end of said shaft may be arranged two ratchet-wheels 41 and 41$^a$, having their teeth of opposite pitch. To one end of the shaft is loosely mounted a disk which is provided with a spring-pressed pawl 42, which engages the ratchet-wheel 41, so as to impart movement to the feed-rolls when the disk is oscillated on the shaft. The disk is connected to a link 43, Fig. 11, which has one end thereof connected to a lever 43$^a$, pivoted to the frame of the machine, said lever 43$^a$ being slotted for a portion of its length and engaged by the end of a vertically-moving rod 44, the said rod having its upper end connected to a lever 45, which is pivoted to the frame of the machine and has one end arranged in the path of movement of the cam 46, (shown by dotted lines in Fig. 1,) secured to the main driving-shaft 47, so that as the cam rotates the lever 45 will be rocked on its pivot, so as to oscillate the lever 43$^a$ and through the link 43 impart a partial rotation to the feed-rolls through the pawl 42 and ratchet-wheel 41. To the rod 44 is secured a bar 48, having a pin or projection 48$^a$, which on its downward movement engages a spring 49, secured to a pawl 50, the latter engaging the ratchet-wheel 41$^a$ at the proper time, causing the feed-rolls to move the proper distance, the spring 49 being adapted to permit the bar 48 to have further downward movement after the pawl has engaged the ratchet-wheel. The pawl in this case is positively disengaged from the ratchet-wheel by the pin 48$^a$ on the rod or bar 48 engaging a bracket or arm 51 on the pawl 50 during the upward movement of said bar.

The stock strip or band as it is fed forward passes between guide-rollers 52, Figs. 1, 3, and 9, journaled upon shafts held in plates 53, secured to the cutting-table 54. These rollers may be of any desired number, and, as shown, there may be three or more journaled on each shaft and suitably spaced apart by means of tubing interposed between the rollers or otherwise, the rollers being arranged to provide an upper and a lower series, so that the stock strip or band may be readily held and guided while being fed by the mechanism 36 to the cutting-dies 57 and 58. The upper die 57 is secured to a cross-head or slide 59 by bolts or otherwise, which cross-head is arranged to move vertically in suitable guides arranged on the frame 20 and is connected by means of a rod 60 to a crank 61, secured to the driving-shaft 47, the said shaft being provided with the usual fast and loose pulleys for imparting motion thereto.

The dies are open and rectangular in form, and adapted to move vertically therein is a folding-plunger 62, which is secured to a cross-head or slide 63, also arranged in guides parallel with the guides of the slide or cross-head 59, and is provided at or near the upper end thereof with a suitable cam-slot, which is engaged by an eccentrically-arranged pin or roller carried by the crank 61, the cross-heads being arranged so as to have a vertical movement when the shaft 47 is rotated and so timed that the plunger will not engage the material until the blank has been cut by the dies 57 and 58. The upper die 57 is provided with end face-plates 64 and side face-plates 65, each provided with suitable scoring edges 66 upon their inner sides, adapted to register with the inner edges of the lower die and mark the blank to indicate the body portion or bottom of the box or tray. Each end face-plate 64 of the upper die is provided with clearance-spaces 67 for the purpose of preventing the gum contained on the blank from coming in contact with said face-plates, and the side face-plates 65 of said die have recessed or cut-away ends adjacent the outer edges of the end face-plates, adapted to register with the raised inclined knives 68 of the side pieces or face-plates 69 of the lower die, the said lower die having end face plates or pieces 70, fitting between the face-plates 69. The material while being fed is normally supported above the inclined knives of the lower die by means of springs 71, the upper die being provided with a knife 72, adapted to cut the stock-strip transversely thereof into the proper width of blank, while the lower die is provided with a knife-plate 73, secured thereto and corresponding to the form of the side face-plates 69 and the inclined knives and serves, together with the inclined knives, to hold the corner-flaps of the blank above the bottom portion thereof, so as to have the start of the same while being formed. The knife 72 of the upper die moves over a cutting-table 54, upon which the material rests, the said table being yieldingly supported by means of the springs 73ª, so as to be depressed when the upper die is forced downward.

The parts thus far described in detail, with the exception of the guiding means between the feeding mechanism and the dies, are substantially the same as those disclosed in the patent granted to me November 14, 1893, and numbered 508,594, and hence are not broadly claimed herein, but only in combination with certain novel features, to be hereinafter referred to, though it is to be understood that any suitable means or mechanism may be substituted for the parts thus described, if desired.

For the purpose of applying gum at the proper points along the strip or band 25 I preferably employ a device such as shown at 74, Figs. 1 to 5, inclusive, which may be supported on the brackets 21 or other portion of the frame between the rolls 27 and 28. This gum or mucilage applying device may consist of a tank 75, adapted to contain hot water or other heating medium, which may be supplied thereto in any suitable manner, and which may be slidingly held in grooves arranged in the brackets or the frame, as the case may be, and normally held therein in any suitably manner. In this heating-tank may be arranged a pan or receptacle 76, adapted to contain mucilage or gum, in which is adapted to rotate the wheels 77, as will be presently explained. These wheels, which in this case are four in number, are preferably peripherally grooved in order to apply the gum in lines from the raised portion thereof in the form shown by stippling in Fig. 17 and have the shafts 78 thereof supported on levers or arms 79, pivoted at 80 to the bar or support 81 on opposite sides thereof, this bar extending transversely of the machine and the gum-receptacle and rigidly secured to slide rods or bars 82 by screws or otherwise, which bars or rods are adapted to move vertically through bosses or extensions arranged upon the heating-tank 75. The bars or rods 82 have their lower ends slotted and engaged by rock-arms 83, pivoted to the brackets on opposite sides thereof and connected so as to move in unison by means of a shaft or otherwise, one of said arms being extended inwardly, as at 84, and connected to a vertically-movable bar 85, which extends upwardly through the machine at one side and to the rear of the cutting-dies, as shown in Figs. 1, 2, and 3, though instead of the rods 82 being slotted and engaged by the arms 83 they may be otherwise arranged, so as to be given a vertical movement. This rod 85 has its upper end engaged by a bracket or projection 86, Fig. 2, which is carried by the cross-head or slide 59 and engages a nut or collar on the rod when moving downwardly, so as to tilt the arms 83 on their pivots and force the gum-applying wheels 77 against the stock strip or band 25, as shown by dotted lines in Fig. 4. Above the bracket or projection 86 is arranged a spring 87, which is interposed between said bracket and a nut or collar on the rod 85, the object of said spring being to provide a yielding connection between the rod and the projection or bracket 86, so that said bracket when the slide or cross-head 59 moves upwardly to raise the rod, so as to tilt the arms 83 on their pivots and return the gum-applying wheels 77 to their normal or lowered position the spring will yield sufficiently to permit further movement of the die 57 and the bracket 86, though in some instances the parts may be returned by gravity, in which case the spring 87 may be dispensed with. Each of the shafts 78 of the gum-applying wheels has a ratchet-wheel 88 rigidly secured thereto, which are engaged by spring-pressed pawls 89, carried by arms 90, loosely mounted, so as to oscillate vertically on the shafts. The outer ends of these arms or levers are each engaged by lugs or pins 91, arranged on opposite sides of said arms or levers and secured to brackets 92, carried by the heating-tank 75, in order that when the slide-rods 82 and the gum-applying wheels are raised the said arms or levers will engage the upper pins and will cause the pawls carried thereby to slip over the ratchet-wheels 88, while during the reverse movement the said arms will engage the lower pins or lugs 91, so as to raise the levers, and thus by means of the pawls 89 impart rotary motion to the ratchet-wheels 88 and the gum-applying wheels 77. A spring-pressed pawl 93 is arranged on one of each pair of the pivoted levers or arms 79, adapted to engage each ratchet-wheel 88 in order to prevent backward movement or too great rotary movement of the wheels 77, the rotary movement of said wheels being for the purpose of supplying a new point of contact at each action of the machine. The arms 79 are normally held in the position shown in full lines in Fig. 4 by means of springs 94, which are secured at one end to the bar 81 and at their outer or free ends engage rods or bolts 95, which connect each pair of arms, so that when the wheels 77 are raised to the position shown at A in dotted lines in Fig. 4 any further movement thereof will cause the arms 79 to be rocked on their pivots 80, as shown at B, same figure, the said springs being adapted to return the arms to their normal position when lowered away from the strip or band 25. Each of the wheels 77 has the gum-applying surface thereof engaged by a suitable doctor-plate 96, which may be secured to the arms or levers 79 and are adapted to clean the wheels at points where the gum is not needed and to remove the superfluous material from the gum-applying surface, so that just the sufficient amount of gumming material may be applied to the surface of the stock strip or band. The stock-band in passing from the roller 27 is preferably carried beneath a plate 97, which is secured to the bed of the machine, and is normally held against said plate by means of a spring or strip 98, Figs. 3 and 4, so as to form an abutting surface for the gumming-wheels when in a raised position. By this means the gum is readily applied to the strip at the proper points and in proper quantities and the wheels 77 permitted to have a rolling motion while in contact with the stock-strip.

The upper die is provided with punches 99, which are preferably V-shaped and have their inner edges substantially parallel and in alinement with the inner scoring edges of the side face-plates 65 of the upper die. These punches are adapted to coact with the ends of the plates 70 and with the inclined knives 68 of the lower die to cut out and remove V-shaped pieces, as shown in Fig. 17, so as to permit the inwardly-folding flaps and the corners to be more readily folded and squared while the box is being formed. The punches have a shearing action with the knives 68, while with the plates 70 a common punching action is secured, so that the V-shaped pieces will not be severed from the blank until the punches pass the edges of the end face-plates and enter the recesses 100 in the lower die, through which the removed pieces are forced or ejected. The dies instead of having single scoring means, as in my patent hereinbefore referred to, are preferably provided with double scoring devices in order that the blank may have double breaking or folding marks on its upper surface, so as to be more readily formed without breaking or injuring the material in any manner. This scoring means may consist of ribs having double scoring edges formed on the inner portions of the end and side face-plates of the upper die, as best shown in Figs. 14 and 15. One of the scoring edges of each rib extends below the other and is adapted to pass by the inner edge of the side face-plates 69 and the end face-plates 70 of the lower die, so as to force this portion of the blank below the upper surface of the lower die at this point, while the shorter scoring edge of each rib presses upon or engages the surface of the blank over the side and end face-plates of said lower die, thus doubly marking the blank to correspond with the rectangular form of the die. The dies may be also provided with double diagonally-arranged scoring devices, which may be at an angle of forty-five degrees to the inner scoring edges, so as to extend across the side face-plates thereof. In this case the scoring edges 101 are arranged on the upper die and are adapted to fit over and aline with the ribs 102 of the lower die 58, the said diagonal scoring permitting the box when formed to be folded over into a collapsed position, as shown in Fig. 21.

In order to assist in folding the boxes and for compressing the same while being folded, I preferably arrange brackets or standards 103 at or near each corner of the lower die, upon the upper portion of which are pivoted folding and separating arms 104. These arms are retained in their normal position or away from the die proper by means of springs 105, as shown in Figs. 3 and 9, so as to abut against a lug or projection extending upwardly from the brackets or uprights 103, said arms being arranged at an incline on said brackets and having their outer or free ends provided with angularly-arranged fingers 106 and 107, which are adapted to work over the inclined knives 68 of the lower die in order to aline the corners or flaps of the box-blank and to separate the inwardly-folding ends of the side flaps forming the corners of the blank from the glue or gum on the end flaps, Fig. 12, until the plunger 62 has pressed the blank well into the lower die.

The arms 104 are provided with extensions or lips 108, arranged near the pivots thereof, which are adapted to be engaged by pins 109, carried by arms or links 110, pivoted to the front and rear faces of the upper die, as best shown in Figs. 3 and 8. These arms 109 are arranged in recesses and pivoted at their upper ends to the face of the upper die and are normally pressed outwardly by means of springs 111, so that when the die is forced downward the pins or projections 109 will pass by the lips 108 of the arms 104 without operating the same; but upon the upward movement of said die the said pins will engage the lips, so as to move the same on the pivots to the position shown in dotted lines at one corner of Fig. 9.

The plunger 62 is rectangular and box-like in form and is provided upon its inner surface with preferably knife-edged plates 112, which are carried by arms or levers 113, pivoted upon the inner surface of the plunger and normally pressed outwardly by means of a curved spring 114, Figs. 14 and 16. The forward and rear outer surfaces of the folding-plunger, at the corners thereof, are relieved equal to the thickness of the paper or material from which the box is formed in order that the inwardly-folding ends $b$ of the side flaps may rest against the surface of the plunger, and the end flaps $b^2$ by resting against the ends $b$ of the blank and the outer surface of the plunger may have a flush or continuous surface against which to bear, as shown in Fig. 18. The lower edges of the plates 112 are adapted to enter the relieved portions of the plunger beneath the lower edge of the inwardly-folding ends $b$ of the side flaps, so as to bear against the lower edges of the end flaps $b^2$ at the scoring-lines of the box in order to provide a firm and sharp bearing-surface throughout the width of the bottom of the box while the end and side flaps are being folded and to square the corners of the box and assist in causing the ends $b$ to readily assume the position necessary for proper folding. This plunger is provided with a tu- 116, working in the cylinder 117, will create sufficient suction to cause the blank to fit snugly against the lower edges of said plunger, the plates 112, together with the lower edge of the plunger, serving, as before stated, to form a continuous bearing-surface at the scoring-lines of the box, so that the latter when formed will be perfectly rectangular. As the box continues to be forced downwardly the pressure-wheels 118 press the end flaps $b^2$ and the inwardly-folding ends $b$ of the side flaps $b'$, Fig. 18, so as to bear firmly against the folding-plunger, so that the flaps will readily adhere. On further movement of the plunger the folded box will be forced into one of the links 122 of the chain 121, so as to rest upon the plate 124, located in the bed 22 of the machine. While the folding-plunger is moving downward the ejecting-plunger 129 at the proper time is caused to enter the link in advance of the lower die, which contains one of the boxes previously formed, and forces the same out of the link into the trough 130, from which it passes to a suitable receptacle or is deposited on the floor, as the case may be. The folding-plunger raises the link 126 as it moves upwardly and carries the lever 125 and pawl 128 to the position shown in dotted lines in Fig. 6, so that as it is again lowered and before the plunger completes its downward movement the chain is advanced the distance of one link, so as to place the link from which the box was previously ejected directly under the die in the path of the folding-plunger. The pin 120 of the folding-plunger engages the surface of the lower die and forces the plates 112 out of contact with the box, so as not to withdraw the same during the upward movement thereof, the stripping-springs, which engage the upper edge of the box, assisting in preventing the latter from being removed from the links of the endless chain. When the upper die and plunger have returned to their normal position, as shown in Fig. 3, the cam 46 on the main shaft acting upon the free end of the pivoted lever 45 will cause the downward movement of the rod 44, which, by means of the feeding mechanism heretofore explained, will cause the stock strip or band 25 to be fed forward over the lower die the proper distance and in position for the next blank to be formed when the upper die is forced downward, as already explained.

I thus provide a simple and efficient machine which will readily make boxes from a strip or band and after being made may be folded or collapsed for transportation or other purposes, and at the same time provide simple and efficient means for applying glue at the proper points along the stock-strip.

The elevated knives 68 of the lower die 58 may have substantially vertical inner surfaces, as at $130^a$ in Fig. 10. These inner surfaces may be of any suitable height and may be substantially parallel with the forward and rear edges of the rectangular opening in the die, so that the inwardly-folding ends $b$ of the side flaps $b'$ may be thrown suddenly upward to assume a vertical position and to have the start of the ends of the box while being folded. In this case the folding-fingers may or may not be used, as desired.

The diagonal scoring edges are shown as forming a double line, as at $b^4$, Fig. 17, upon the upper surface of the blank, so that the parts may be collapsed, as shown in Fig. 21; but it will be understood that the reverse of this may take place—that is, the double scoring edges may be placed on the lower die and the rib on the upper die, so as to cause the double scoring to be on the under surface of the blank and the single scoring on the upper surface thereof. The box in this case when formed may be folded inwardly instead of outwardly; but in practice it is desirable to use the form and arrangement shown.

While I have described the operation of forming only one member of the box, it will be understood that a similar member may be made by changing the size of the dies so that one may serve as the lid and the other the tray or box proper, or simply the trays may be formed and shucks or enveloping-covers made in a different machine. In the former case the diagonal scoring of one member will extend across the scoring of the other, thus reinforcing and strengthening the box at this point.

It will be understood that it may be found desirable and that I may in some instances dispense with the folding-arms and the mechanism for operating the same and that some of the features may be dispensed with or others substituted therefor without departing from the spirit of my invention.

Having thus described my invention, I claim as new and desire to secure by Letters Patent—

1. In a machine for making paper boxes, the combination with an open rectangular die provided with a clearance-space at each of its corners, of a similar second die having at each end two elevated knives adapted to support the corners of the blanks above the level of the body portions thereof and to enter the respective clearance-spaces at the corners of the upper die, and a folding-plunger adapted to move vertically in the said dies by which the blanks are forced into the lower die, said knives having substantially vertical inner surfaces above the upper surfaces of the lower die which are substantially parallel with the forward and rear edges of the rectangular opening in said die, whereby the inwardly-folding ends of the side flaps may be thrown suddenly upward when the box-blank is forced downward, substantially as described.

2. In a machine for making paper boxes, the combination with the upper open rectangular die, of a similarly-formed lower die adapted to register with the said upper die, and a folding-plunger movable in the dies, one of said dies having double scoring-ribs bular piston-rod 115, which has an open piston 116 secured to the upper end thereof, adapted to enter a cylinder 117, secured to and carried by the slide or cross-head 59, so that on the downward movement of the plunger the piston will create sufficient suction to force the blank snugly against the lower surface of the plunger, so as to permit it to be more readily folded, while a further movement of the plunger removes the piston 116 from the cylinder 117 and forces the blank farther into the lower die and against the compressing-rollers 118, arranged therein. These pressure-rollers are in alinement with the corners of the boxes and journaled upon shafts secured in brackets or lugs projecting outwardly from the forward and rear faces of the lower die and extend slightly beyond the inner surface thereof, so as to press the glued parts together, as best shown in Figs. 10 and 19. The boxes in being forced past the compressing-rollers 118 will have the flaps tightly pressed together and on further movement will be forced below the stripping-springs 119, which have their ends adapted to fit over the upper edges of the box when forced below the same, so as to prevent the box from being carried upwardly during the upward movement of the folding-plunger. The folding-plunger is provided with pins 120, Fig. 16, which are normally pressed outwardly by means of the spring 114 and leaves or arms 113 and are adapted to engage the inner surface of the lower die in order to force the plates 112 inwardly to remove the pressure of the same from the folded ends of the boxes.

As a means for carrying the boxes after being formed for a length of time sufficient to permit the glue to set, so as to prevent their separation, I may arrange a passage through the lower die, through which is adapted to travel an endless carrying belt or chain 121. This chain is made up of a series of box-like links 122, corresponding to the size of a box, and is provided at the joining-points with wheels 123, which may be grooved, so as to travel over a track arranged upon the bed 22 of the machine-frame. These links may be of any suitable form and are adapted to successively register with the inner surfaces of the dies in order that each box as it is formed and forced downwardly by the plunger 62 may be forced directly into the links upon a plate 124 or the machine-bed, so as to raise the bottom slightly above the lower edges of the sides when the box is formed. Various means for operating the links may be provided, and, as shown in Figs. 2 and 6, I have pivoted a lever 125 to one of the uprights or standards of the frame upon the inner surface thereof, which is adapted to be rocked backward and forward by means of a link 126, pivoted at one end to the lever 125 and at its other end to a bracket 127 or other portion of the movable slide 59 when the latter is raised or lowered. To the lower end of the lever 125 I may pivot a pawl 128, having one end thereof slotted or recessed and adapted to engage pins projecting outwardly from the side of the links of the chain 121, the movement of said pawl being sufficient to advance the chain the distance of one link, a spring or other suitable device (not shown) being provided to prevent too great movement of said chain.

In advance of the dies, Figs. 2 and 6, I provide a plunger 129, which is secured at its upper end to the bracket or other portion of the folding-plunger in order that the said plunger 129 during the downward movement of the folding-plunger 62 may force the box out of the link in advance of the dies into a trough, as 130, Fig. 1, or into a suitable receptacle provided therefor, said trough having its upper end open and registering with the link beneath the plunger 129.

The construction and operation of the machine will be readily understood from the foregoing description when taken in connection with the accompanying drawings.

The parts being in the position shown in Fig. 3 and motion imparted to the driving-shaft 47, the upper die will be forced downward by means of the connecting-rod 60 and slide or cross-head 59 to the position shown in Figs. 1 and 2. By this movement the blank will be severed from the strip 25 and properly scored, as shown in Fig. 17. As the upper die moves downward the projection 86 engages the nut or collar on the rod 85 and forces the same downward, thereby rocking the arms 83 on their pivots through the extension 84 of one of said arms. This movement of the arms forces the rods 82 upward, carrying the gum or glue applying wheels 77 to the position shown at A, Fig. 4, so as to apply glue to the edges of the stock 25, and on further movement the arms carrying said wheels will assume the position shown at B, same figure, causing the gum to be spread toward the edge of the stock strip or band with a rolling action. At this time the plunger 62 will be forced downward, carrying the blank therewith, and simultaneously with this downward movement of the plunger the upper die will be carried upwardly again, so as to cause the pins 109 upon the arms 110 to engage the lips 108 of the arms 104, thus rocking the said arms 104 on their pivots and causing the fingers 107 to lift the inwardly-folding ends $b$ of the side flaps above the gum at $b^3$, heretofore applied to the end flaps $b^2$ of the blank, Figs. 12 and 17, while the finger 106 engages the side flaps of the boxes, so that the latter are properly alined and squared at this time. As the cross-head and upper die move upward the rod 85 will be raised by the projection 86 acting against the spring 87 on said rod, said spring permitting further movement of the cross-head and projection after the glue-applying wheels are returned to their normal position. The folding-plunger in the meantime continues to lower, and in so doing the piston of unequal height, the shorter of which are adapted to engage and score the box-blank against the solid supporting-surface of the other die, while the other ribs force a portion of the box-blank below the supporting-surface of said die, thus doubly scoring the blank to permit the same to be readily folded, substantially as described.

3. In a machine for making paper boxes, the combination with the upper open rectangular die having a clearance-space at each of its corners and a cutting-punch adjacent to each clearance-space, of a similar lower die having recesses or clearance-spaces into which the upper punches are adapted to fit, and a folding-plunger adapted to fit and move vertically in the upper and lower dies and force the blank into the lower die, one of said dies having double scoring-ribs of unequal height, the shorter of which are adapted to engage and score the box-blank against the solid supporting-surface of the other die, while the other ribs force a portion of the box-blank below the supporting-surface of said die, thus doubly scoring the blank to permit the same to be readily folded, substantially as described.

4. In a machine for making folding paper boxes, the combination with the upper open rectangular die, of a similarly-formed lower die adapted to register with said upper die, and a folding-plunger movable in the dies and adapted to force the blank into the lower die in a folded position during the downward movement thereof, the said dies being provided with angular scoring means so as to score or mark the blank to permit the box when formed to be collapsed, and one of the dies being provided with double scoring-ribs of unequal height, the shorter of which are adapted to engage and score the box-blank against the solid supporting-surface of the other die, while the other ribs force a portion of the box-blank below the supporting-surface of said die, thus doubly scoring the blank to permit the same to be readily folded, substantially as described.

5. In a machine for making paper boxes, the combination with the upper die, of a lower die adapted to support the material from which the box is formed and to coact with the upper die in cutting and forming the blank, a folding-plunger adapted to fit into the said dies, a vertically-movable cutting-table located on one side of the lower die, a knife located on one side of the upper die and arranged to depress the said table when the said die descends, and guide-rolls journaled upon the table between which the stock strip or band is fed, substantially as described.

6. In a machine for making paper boxes, the combination with the upper open rectangular die having a clearance-space at each of its corners, of a similar lower die having at each end two inclined elevated knives adapted to support the corners of the blanks above the level of the body portion thereof, to enter respective clearance-spaces at the corners of the upper die and to coact with the upper die in cutting the ends of the blanks to form the corners of the same, a folding-plunger adapted to fit into the dies, pivotal arms having the free outer ends thereof movable over the inclined elevated knives of the lower die for lifting the elevated corners of the blanks so as to aline and separate the corner of the blank from the gum on the end flaps thereof, and means for operating said arms, substantially as described.

7. In a machine for making paper boxes, the combination with the upper rectangular open die having a clearance-space at each of its corners, of a similarly-formed lower die having two inclined elevated knives adapted to support the corners of the blanks above the level of the body portion thereof, to enter the respective clearance-spaces at the corners of the upper die and to coact with the upper die in cutting and forming the blanks, a folding-plunger movable vertically in the said dies, pivotal folding-arms having angularly-disposed fingers at their free outer ends adapted to move over the inclined surface of the elevated knives of the lower die and to aline and separate the ends of the side flaps forming the corners from the gum or glue on the end flaps while being folded, and means carried by the upper die for operating said folding-arms, substantially as described.

8. In a machine for making paper boxes, the combination with the upper open rectangular die having a clearance-space at each of its corners, of a similar lower die having at each end two inclined elevated knives adapted to support the corners of the blanks above the level of the body portion thereof, to enter the respective clearance-spaces at the corners of the upper die and to coact with the upper die in cutting the ends of the blanks to form the corners of the same, a folding-plunger movable in the dies, pivotal arms having the free outer ends thereof movable over the inclined elevated knives of the lower die for lifting the elevated corners of the blanks so as to aline and separate the corners of the blank from the gum on the end flaps thereof, and spring-pressed arms pivoted to the upper die and having projections thereon adapted to engage portions of the folding-arms so as to move the latter on their pivots, substantially as described.

9. In a machine for making paper boxes, the combination with a pair of dies, of pivotal folding-arms provided with fingers adapted to move across the face of the lower die, means carried by the upper die for engaging with and operating said arms, and a folding-plunger movable in said dies, substantially as described.

10. In a machine for making paper boxes, the combination with an upper and a lower open rectangular die, of spring-retained folding-arms pivoted at or near the corners of the lower die so as to be moved over the face thereof, the said arms having angularly-disposed fingers to assist in alining and holding the sides and corners of the box-blank and to enter between the corner-flap and the ends of the box-blank to keep the ends and corners apart until the box is squared, and spring-pressed levers pivoted to the upper die and having projections thereon adapted to engage lips or projections on the folding-arms so as to operate the latter during the upward vertical movement of the upper die, substantially as described.

11. In a machine of the character described, a gum-applying device, comprising a vertically-movable support, arms pivotally held to said support, springs normally holding the arms in one position, wheels journaled upon the pivoted arms and mechanism for giving an intermittent rotary movement to said wheels, substantially as described.

12. In a machine for making boxes, a gum-applying device, comprising a vertically-movable support, arms pivotally held upon the support, gum-applying wheels journaled on the arms, and a pawl-and-ratchet mechanism for giving an intermittent rotary movement to said wheels, substantially as described.

13. In a machine for making paper boxes, the combination with a movable support, mechanism for imparting a vertical movement to said support, rotatable gum-applying wheels carried by the support, ratchet-wheels rotatable with the gum-applying wheels, oscillatory levers movable with the support, pawls arranged on the levers and engaging the ratchet-wheels, and means for actuating the oscillatory levers during the vertical movement of the support so as to intermittently rotate the ratchet and gum-applying wheels, substantially as described.

14. In a machine for making paper boxes, the combination with a suitable support, of means for imparting a vertical movement to said support, arms pivoted to the support intermediate its ends, springs retaining the outer or free ends of the arms upon the support, wheels journaled in the inner ends of the pivoted arms, oscillatory levers carrying pawls arranged to engage the ratchet-wheels, and stationary brackets having lugs or projections arranged on opposite sides of the oscillatory levers adapted to rock said levers on their pivots when the support and wheels are given a vertical movement, substantially as described.

15. In a machine for making paper boxes, the combination with a receptacle for an adhesive material, of a support movable above said receptacle, mechanism for imparting a vertical movement to said support, arms pivoted to the support intermediate its ends, springs retaining the outer or free ends of the arms upon the support, gum-applying wheels secured to shafts journaled in the inner ends of the pivoted arms, ratchet-wheels secured to the shafts, levers carrying pawls arranged to oscillate on the grooved wheel-shafts, and means for actuating the oscillating levers during the vertical movement of the support to intermittently rotate the ratchet and gum-applying wheels, substantially as described.

16. In a machine for making paper boxes, the combination with a receptacle for an adhesive material, means for heating the said receptacle, a support movable above said receptacle, mechanism for imparting a vertical movement to said support, arms pivoted to the support intermediate its ends, springs retaining the outer or free ends of the arms upon the support, grooved wheels secured to shafts journaled in the inner ends of the pivoted arms, a doctor-plate adapted to contact with each grooved wheel and carried by the pivoted arms, ratchet-wheels secured to the shafts, levers carrying pawls arranged to oscillate on the grooved wheel-shafts, and stationary brackets having lugs or projections arranged on opposite sides of the oscillating levers adapted to rock said levers on their pivots when the grooved wheels and support are given a vertical movement, substantially as described.

17. In a machine for making paper boxes, the combination with the lower blank-forming die, of a folding-plunger, and means for moving the same within the lower die, said folding-plunger being substantially box-like in form and provided with swinging plates arranged upon the inner surface of the plunger and adapted to hold and square the bottom of the box-blank, means for forcing the plates outwardly, and means adapted to engage the surface of the lower die for forcing the plates inwardly from the boxes, substantially as described.

18. In a machine for making paper boxes, a rectangular hollow folding-plunger having swinging plates upon the inner surface thereof adapted to engage the bottom of the box-blank to hold the same while being formed, means for normally forcing the plates outwardly, and pins arranged in the plunger and adapted to force the plates inwardly against the action of the spring, substantially as described.

19. In a machine for making paper boxes, the combination with an upper and a lower die, of a folding-plunger adapted to fit and move in said dies, a cam-actuated slide for imparting a vertical movement to the folding-plunger, knife-edged plates secured to leaves pivoted upon the inner surface of the folding-plunger, a spring normally forcing said plates outwardly so as to engage and hold the lower edges of the box-blank while being formed, pins slidingly held in the plunger and having the outer end thereof adapted to engage the inner surface of the lower die during the movement of the plunger so as to force the plates inwardly away from the box-bottom during the vertical movement of the plunger, substantially as described.

20. In a machine of the kind described, the combination with box-forming dies, of the folding-plunger movable in said dies, and a pump adapted to exhaust the air from within the plunger, substantially as described.

21. In a machine for making boxes, the combination with the upper and lower open dies, of the hollow box-like folding-plunger adapted to move vertically in said dies, a hollow tubular piston-rod connected with the plunger and provided with a suitable piston, and a cylinder moving with the upper die into which the piston is adapted to work so as to exhaust the air from within the folding-plunger to cause the blank to adhere closely to its lower edge, substantially as described.

CAESAR R. BANNIHR.

Witnesses:
W. B. HUTCHINSON,
BERTHA DEYO.